(12) United States Patent
Allaei

(10) Patent No.: US 6,564,640 B1
(45) Date of Patent: May 20, 2003

(54) SMART SKIN STRUCTURES

(75) Inventor: Daryoush Allaei, Minnetonka, MN (US)

(73) Assignee: Quality Research, Development & Consulting, Inc., Chaska, MN (US)

( * ) Notice: Subject to any disclaimer, the term of this patent is extended or adjusted under 35 U.S.C. 154(b) by 0 days.

(21) Appl. No.: 09/724,369

(22) Filed: Nov. 28, 2000

(51) Int. Cl.[7] ................................................. G01H 1/00
(52) U.S. Cl. ............................. 73/583; 73/588; 73/600; 73/602
(58) Field of Search ........................ 73/583, 588, 589, 73/598, 599, 600, 602, 862.11, 862.42, 11.01, 12.07; 74/574, 659

(56) References Cited

U.S. PATENT DOCUMENTS

| | | | | |
|---|---|---|---|---|
| 3,693,402 A | * | 9/1972 | Jones | 73/650 |
| 4,051,718 A | * | 10/1977 | Meckl et al. | 73/654 |
| 5,404,755 A | * | 4/1995 | Olson et al. | 73/639 |
| 5,408,305 A | * | 4/1995 | Webster et al. | 356/35.5 |
| 5,519,637 A | * | 5/1996 | Mathur | 700/280 |
| 5,814,729 A | | 9/1998 | Wu et al. | |
| 6,032,552 A | * | 3/2000 | Alleai | 74/574 |
| 6,127,942 A | * | 10/2000 | Welle | 340/870.16 |
| 6,378,377 B2 | * | 4/2002 | Matuseski et al. | 73/627 |
| 6,394,242 B1 | * | 5/2002 | Allaei | 188/378 |

FOREIGN PATENT DOCUMENTS

DE    198 13 959    9/1999

OTHER PUBLICATIONS

Journal of Sound and Vibration (1995) 179(4), 553–567, Vibration Confinement in flexible structures via alteration of mode shapes by using feedback, A.S Yigit et al.*

* cited by examiner

Primary Examiner—Hezron Williams
Assistant Examiner—Jacques Saint-Surin
(74) Attorney, Agent, or Firm—Leffert Jay & Polglaze, P.A.

(57) ABSTRACT

A smart skin structure has vibration energy managing and steering capabilities. The skin can be used to managing vibrations in the skin or shell of a system, subcomponent, device, or structure. The skin has sensors coupled to the skin to obtain a response to vibrations. Actuators integral with the skin can be selectively activated to apply forces to the skin to confine or redirect vibration energy to one or more predetermined skin regions. The forces applied by the actuators can be controlled to create confinement power flows. Further, the skin actuators can be controlled using spatial derivatives of the vibration forces. The structure can be used in, but is not limited to, watercraft, aircraft, space vehicles, automobiles, marine devices, industrial machinery, machine tools, home appliances, buildings, bridges, and offshore oil platforms.

29 Claims, 7 Drawing Sheets

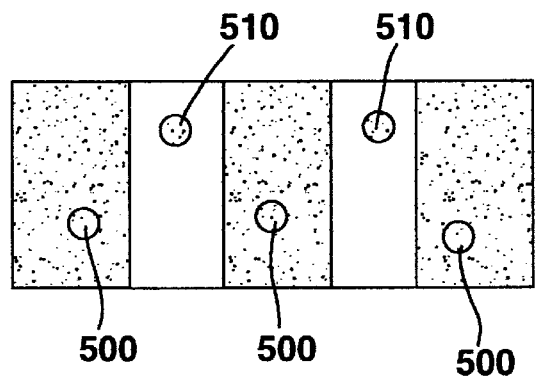
FIG. 5A
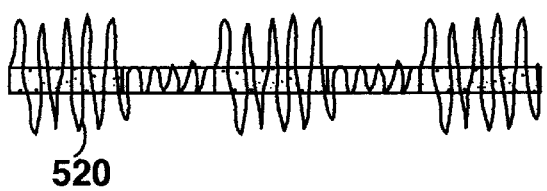
FIG. 5B
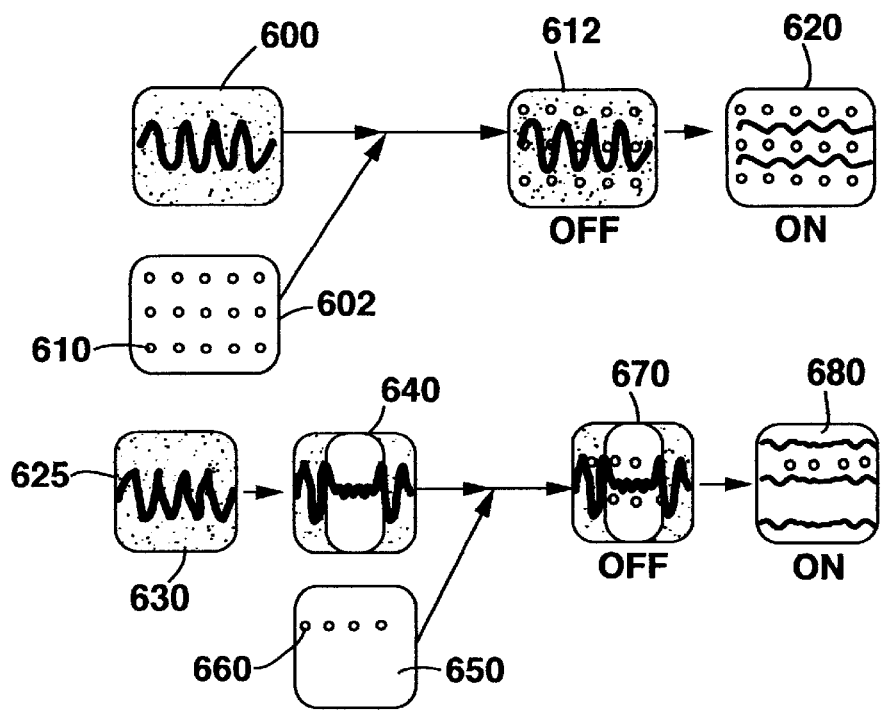
FIG. 6A
FIG. 6B

SMART SKIN STRUCTURES

STATEMENT AS TO RIGHTS UNDER FEDERALLY SPONSORED RESEARCH AND DEVELOPMENT

The U.S. Government has a paid-up license in this invention and the right in limited circumstances to require the patent owner to license others on reasonable terms as provided for by the terms of (Contract No. DASG60-00-C-0077) awarded by BMDO (Ballistic Missiles Defense Organization).

TECHNICAL FIELD OF THE INVENTION

The present invention relates generally to smart skin structures with vibration energy managing and steering capabilities and in particular the present invention relates to managing vibrations in the skin or shell of a system, subcomponent, device, or structure.

BACKGROUND OF THE INVENTION

Current passive vibration suppression methods are grouped in three main areas: energy isolation, energy absorption, and energy dissipation through damping material and/or damping devices. As the name implies, absorbers are added single- or multiple-degree-of-freedom systems designed to absorb vibration energy, while isolators intercept the flow of vibration energy and prevent transmission to or from the system under consideration. Note that in the former, the energy is taken out of the primary system and directed to the absorbers while in the latter case, the energy is trapped to either side of the isolators. In the case of added damping, however, energy is dissipated in the form of noise and/or heat. There are many advantages for using these passive methods. Vibration isolators, absorbers, and added damping elements are well understood and have relatively simple mathematical models to aid in incorporating them in the design stage, and have been used by designers and engineers for over a century. They may be easy to manufacture and low cost to apply. However, passive methods have a few important performance disadvantages. Isolators and absorbers are usually tuned to one or a few selected resonant frequencies and, therefore, they are most effective within a narrow band around the selected resonant frequencies. Their performance degrades away from the designed frequency ranges. In certain cases, they may even amplify undesired vibrations.

Vibration isolators are not effective when severe shock or vibratory loads are present. The primary role of added damping in a structure is to take out more energy at a faster rate. Thus, their performance depends on how well and how much energy is delivered to the damping mechanism by the structure. Because structural vibrations are maximum at resonance, damping treatment methods are most effective at and near the resonant frequencies. Weight penalty is a concern when absorbers or added damping elements are used to reduce low frequency vibrations. Furthermore, most damping materials have a limited temperature range and perform better at higher frequencies. Therefore, a more effective vibration suppression scheme with a broader frequency range is needed.

In recent years, a variety of AVC (Active Vibration Cancellation) methods have been introduced to actively suppress vibrations. Most of these AVC techniques are based on vibration concepts that have been combined with advances in microelectronics, signal processing, material science, and control strategies to make a more adaptable and effective vibration suppression system. In the case of the currently practiced AVC systems with feedback controllers, vibrations are measured, fed back to the controller, and an appropriate actuating action is taken. In this case, the actuator applies a force or moment to counteract the existing vibrations. In the case of AVC systems with feed-forward controllers, the source is measured, fed forward to the controller, and then an appropriate actuating action is taken. In this case, actuators are used to inject an identical disturbance with an appropriate phase shift with respect to the measured signal at or near the source. Even though both AVC methods are conceptually different, they have at least two common features: they both inject energy into the system to cancel the existing undesired vibrations or noise, and they operate in a reactive mode (i.e., sense, process, and respond). Current AVC methods are not capable of altering the flow of vibrational energy within the structure.

U.S. Pat. No. 6,116,389, entitled "Apparatus and Method for Confinement and Damping of Vibration Energy," issued Sep. 12, 2000, and U.S. Pat. No. 6,032,552, entitled "Vibration Control by Confinement of Vibration Energy," issued Mar. 7, 2000, address vibration problems by noting that it may not be possible or practical to completely suppress vibration for all parts of a system. The patents, however, recognize that it may be practical to redirect or confine vibration to less critical or more easily controllable regions. In these patents, the confinement is implemented by passive or semi-active means which controlled the position and/or stiffness of structural or machinery components.

Metallic and composite skins, such as panels surrounding an automobile, walls and wallpapers used in construction, and boxes containing computers, are very important and integral parts of a system. In particular, spaceships, aircraft, ships, and submarines have load-bearing skins that not only have to withstand severe aerodynamic and hydrodynamic loads (thus, load-bearing), but also must carry arrays of optical, acoustic, and radar-type sensors. One of the primary tasks of a skin is to protect its cargo and sensor arrays.

Currently all skins (i.e., aircraft skin, automobiles, appliances, etc.) are simply a relatively thin layer of either isotropic metal or multi layer composites. In addition to conventional tasks, it would be desirable to have a skin that has the ability to manage and steer vibration energy to minimize the damaging effect of vibratory loads. A skin that can control noise and vibrations, via the control of power flow and energy management, could be well suited to monitor the health of its host system (or component). That is, the skin could detect damages and cracks at early stage, and localize damage so it can be rapidly inspected and repaired before propagating to the rest of the system.

For the reasons stated above, and for other reasons stated below which will become apparent to those skilled in the art upon reading and understanding the present specification, there is a need in the art for intelligent skin that can be implemented to actively alter vibration energy within the structure.

SUMMARY OF THE INVENTION

The above-mentioned problems with structural vibrations and other problems are addressed by the present invention and will be understood by reading and studying the following specification.

The present invention provides a system that senses the amount, location, and type of disturbing energy and confines, diverts, and steers excess disturbing energy in order to protect itself and all components it carries from potential damage due to random propagation of excess disturbing energy.

In one embodiment, a skin structure comprises a skin, sensors coupled to the skin to measure vibrations of the skin, and actuators integral with the skin. The actuators can be selectively activated to apply forces to the skin to confine or redirect vibration energy to one or more predetermined skin regions. A passive element can then be used to dissipate the confined vibration energy. The forces to be applied can be determined by spatial derivatives of the vibrating system or through phase and magnitude of the detected vibrations. Using the magnitude and phase of the detected disturbance, the appropriate phase and magnitude of the forces applied by the actuators are determined.

In another embodiment, a structure having a skin material comprises an outer layer, sensors coupled to the outer layer to measure vibrations in the outer layer, actuators integral with the skin, and a controller coupled to the sensors to provide control signals to the actuators.

In another embodiment, a method is provided for controlling vibrations in a skin structure. The method includes detecting vibrations in the skin structure, and applying feedback forces to actuators integrally formed in the skin to confine or redirect vibration energy by creating an energy power flow pattern in the skin.

Another method of controlling vibrations in a skin structure is provided. The method comprises detecting vibrations in the skin structure, and processing the detected vibrations to determine appropriate feedback forces need to confine the vibrations. The feedback forces are compared to historical data and baseline data to determine if a defect is present in the skin structure. Finally, the feedback forces are applied by the actuators integrally formed in the skin to confine or redirect vibration energy.

BRIEF DESCRIPTION OF THE DRAWINGS

FIGS. 5A and 5B illustrate one embodiment of a skin structure confining vibrations using special derivatives;

FIGS. 6A and 6B illustrate some differences between a energy management system of one embodiment of the present invention and currently practiced active vibration confinement methods.

DETAILED DESCRIPTION OF THE INVENTION

Figure 1A:
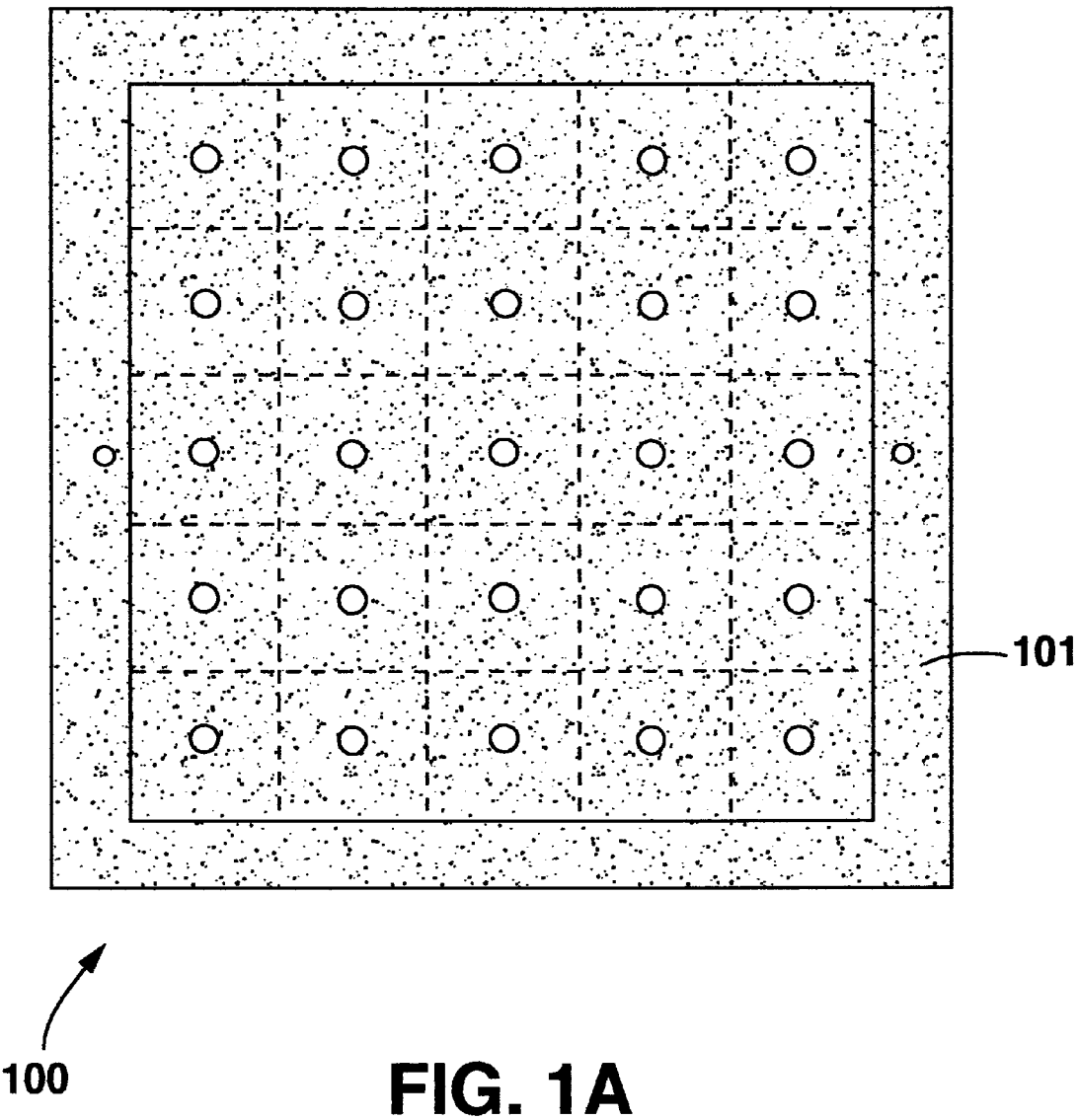
FIG. 1A illustrates a top view of a structure skin of an embodiment of the present invention.

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

The present invention relates to load-bearing skin structures with integrated energy-based hybrid vibration and noise control systems. The vibration control strategy relies on a vibrational energy management system. The vibration control system comprises both passive and active elements, each of which has two functions. The passive elements provide energy dissipation at high frequencies and energy absorption at resonance frequencies of the skin structure. Constrained layer damping (CLD) and tunned-mass dampers (TMD) can be implemented for passive elements. The active elements dissipate energy at low frequencies and to steer vibrational energy to specified regions where excess energy can be more effectively absorbed or dissipated by passive and/or active elements. As explained above, the active elements are incorporated in skin material. Piezoelectric rod actuators can be used in one embodiment for active elements. These passive and active elements allow energy management to be implemented in load bearing skin structures, thereby, producing a high efficiency smart skin structure. Smart skin structures have the capability of steering excited vibration energy in an efficient and effective manner to minimize damaging effects and/or radiated noise of propagating vibrations.

Numerous different materials can be used as sensors and/or actuators in smart skins of the present invention. Piezoelectric technology (PZT) is only one of the many materials suitable for smart skin applications. Piezoelectric technology can be applied as an actuator in active vibration control. Piezoelectric materials can be used to convert electrical energy into mechanical energy and vice versa. Piezoelectric technology is widely used in precise motion (nanoscale) because of its many useful properties such as repeatability in high frequency, wide load range, and no maintenance. Lead zirconate titanate (PZT) based ceramic materials are the most often used. Some basic designs for PZT actuators include, but are not limited to a rod design, stack design, laminar design, tube design, and bender type designs. In a stack design, the actuator consists of a stack of ceramic disks separated by thin metallic electrodes. Maximum operating voltage is proportional to the thickness of the disks. Stack design actuators can withstand high pressure and have the highest stiffness of all piezoelectric design actuators. Spring preloaded actuators are considered because ceramics cannot withstand large pulling forces. This design can be used for static and dynamic operation. In a laminar design, the actuator consists of thin ceramic strips. The displacement of these actuators is perpendicular to the direction of polarization and the electric field. The maximum travel is a function of the length of the strips, and the number of parallel strips determines the stiffness and stability of the element. In a tube design, the actuators operate on the transversal piezoelectric effect. When a voltage is applied between the outer and inner diameter, the tube contracts axially and radially. When the outside electrode of the tube is separated into four segments, different drive voltages lead to bending of one end. In a bender-type design, the actuators operate similarly to a bimetallic strip in thermostats. When the ceramic is energized, the metal substrate is deflected with a motion proportional to the applied voltage.

In one embodiment, the present invention uses active actuators provided with a skin of a structure to induce a set of forces proportional to the spatial derivative (i.e., strain, shear force) of the structure at the point of application. In contrast, conventional actuators used in active control systems generate a set of forces proportional to the temporal derivatives of the displacement (i.e., velocity or acceleration). In another embodiment, the present invention uses active actuators provided with a skin of a structure to induce a set of forces defined by vortex power flow (VPF), as explained below. As such, the present invention provides a 'smart' skin that can be used in a limitless number of structural applications. The smart skin includes sensors and actuators that allow for management of the structure's vibrations. The manner in which the actuators are controlled can be based on creating vortexes in the energy flow and/or the actuators can be controlled in response to spatial derivative of the system displacement.

Figure 1B:
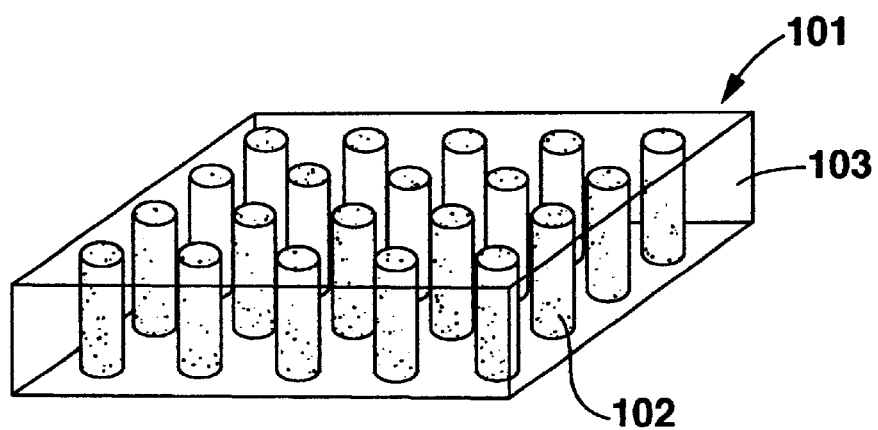
FIG. 1B illustrates a perspective view of a structure skin of an embodiment of the present invention.
Figure 1C:
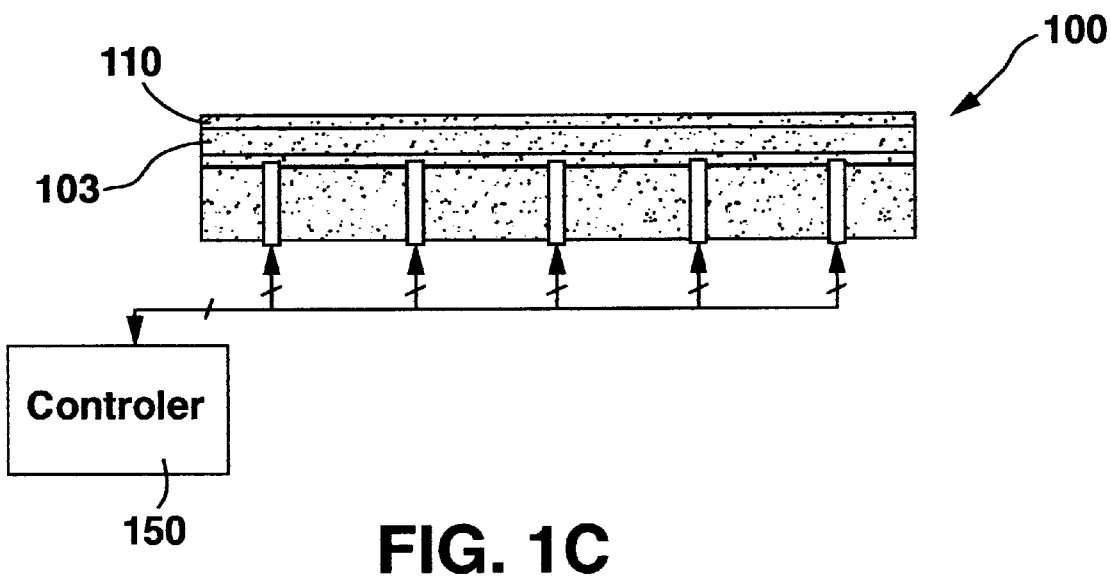
FIG. 1C illustrates a cross-section view of a structure skin of an embodiment of the present invention.

FIGS. 1A, 1B and 1C respectively illustrate a top view, a perspective view and a cross-section view of a portion of a structure skin 100 or surface. Referring to FIG. 1A, one embodiment of the skin has numerous cells 101 that each contain actuators. A perspective view of one cell 101 is illustrated in FIG. 1B. The skin can be fabricated from a suitable material, but will typically be formed with a metal or composite outer layer 110. The skin can have a layer of insulator 103. The skin has actuators 102 located in a pattern and integral with the skin insulator layer 103, if provided. The actuators are positioned to selectively exert forces on the outer layer 110. The actuators in the illustrated embodiment are piezoelectric rods that can exert a force on the skin structure. The actuators can be arranged in a grid pattern, or other patterns specific to the structure configuration. The piezoelectric rods expand when subjected to an electric field. Likewise, the piezoelectric rods can provide an electric field when they are subjected to forces. Thus, some of the piezoelectric rods can be used as sensors to detect vibration present in the skin. Referring to FIG. 1C, the sensors are coupled to a controller 150 that provides active feedback to the rods operating as actuators. Other types of sensors and actuators are contemplated, and the present invention is not limited to piezoelectric devices. The actuators can be separate add-on components to the skin structures. Actuators that are integral with the skin, however, provide more design options. As explained below, the present invention can provide energy management for transportation and consumer systems, devices, subsystems, subcomponents, and structures. For example, the skin of automobiles and aircraft can incorporate the present invention. Consumer items such as refrigerators, air conditioners and washing machines can also incorporate the present skin structures.

Figure 1D:
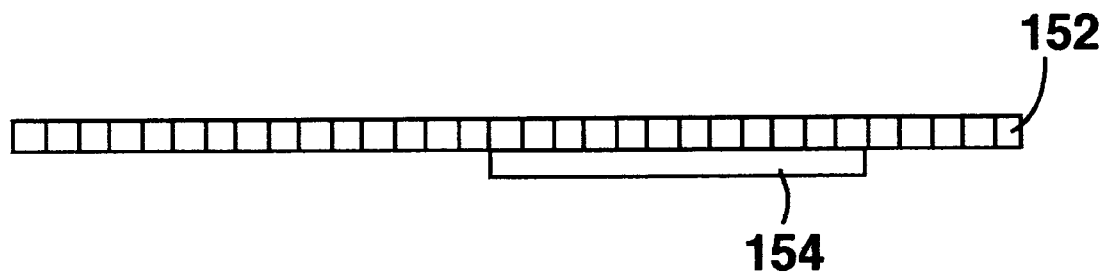
FIG. 1D illustrates a cross-section view of a flat structure skin of an embodiment of the present invention having a passive element.
Figure 1E:
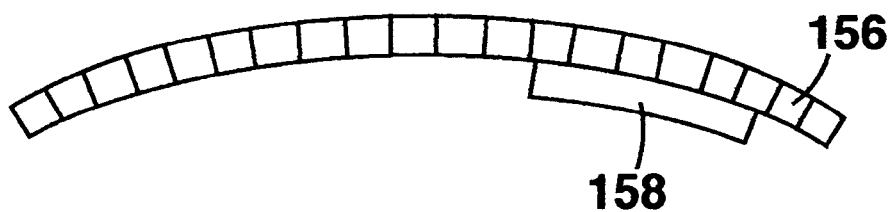
FIG. 1E illustrates a cross-section view of a curved structure skin of an embodiment of the present invention having a passive element.

FIG. 1D shows a simplified cross-section of one embodiment of a flat skin structure 152. The skin structure includes a passive element 154 that is coupled to the skin to dissipate vibration energy confined to the skin location area containing the passive elements. FIG. 1E shows a simplified cross-section of one embodiment of a curved skin structure 156. The skin structure includes a passive element 158 that is coupled to the skin to dissipate vibration energy confined to the skin location area containing the passive elements. It will be appreciated that flat and curved skin elements can be used to construct any number of different shapes, such as spherical.

Figure 2:
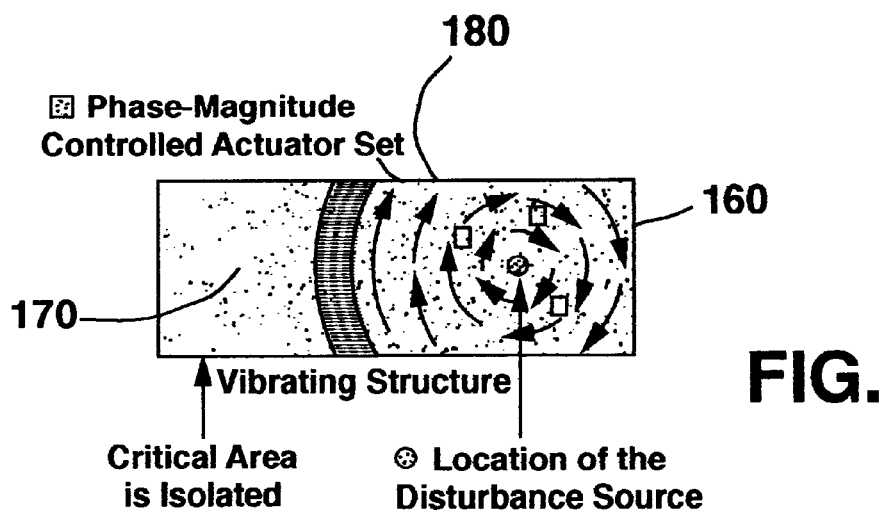
FIG. 2 illustrates a circulating confinement that can be induced using an embodiment of the present invention.
Figure 3:
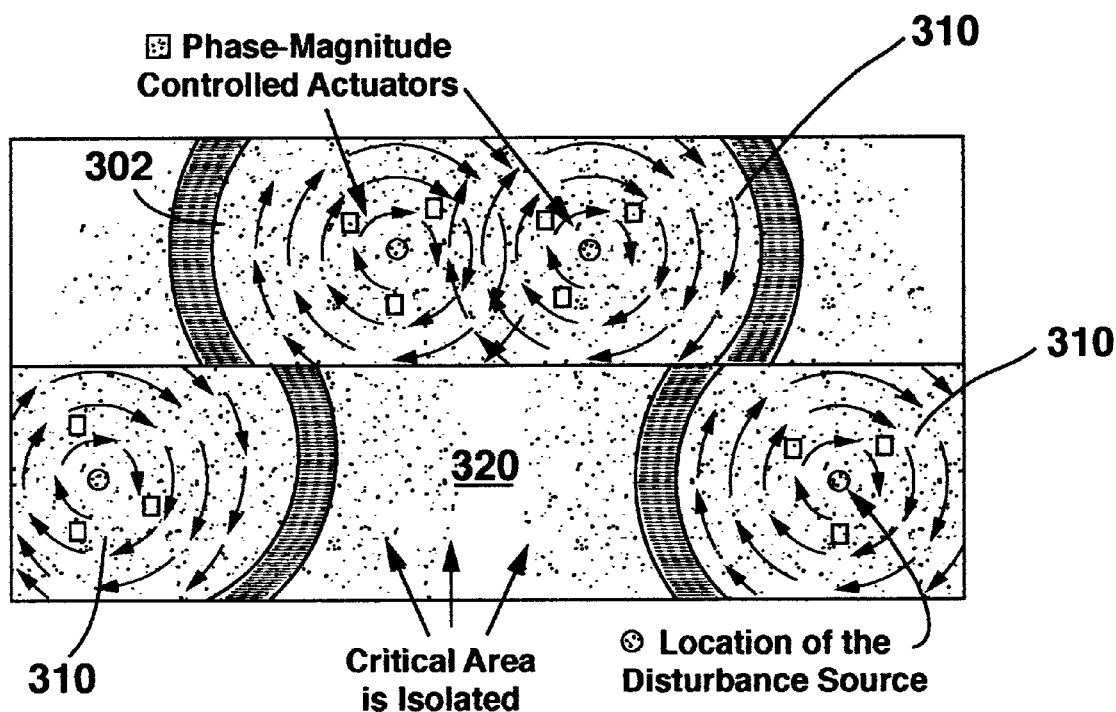
FIG. 3 illustrates vortex confinement that can be induced using an embodiment of the present invention.

In one embodiment of the present invention, Energy Confinement by Vortex Power Flow (EC-VPF) can control the feedback forces applied to the skin. Vortex-type intensity response patterns generated in a structure, subjected to steady-state vibrations, have a strong potential for confining the vibration power flow to a specific area of the structure. FIG. 2 shows a circulating confinement 160 (i.e., vortex power flow) that can be induced by controlling the magnitudes and phases of an array of attached actuators. Inducing power flow vortexes by an active control system is an effective way to divert vibrational power flow away from critical sections 170 in a structure 180. In certain applications, such diversion of vibrational power flow may be more effective than the conventional methods used to suppress or dissipate vibrational energy. It is noted that the power required to actively divert vibrational energy can be significantly less than actively suppressing energy. Referring to FIG. 3, vortex confinement can be induced using an embodiment of the present invention. Several areas 310 having circular power flow are induced in the skin to isolate critical areas 320 of the skin. Actuators 302 within the skin structure are used to induce the confinement power flows.

When a loss-less structure is subjected to an external force, the natural vibration modes of the structure are not instantly excited. The external energy injected into a structure propagates as a progressive wave throughout the structure until reaching its boundary. Depending on the characteristics of the boundary, evanescent as well as reflected waves are generated in the structure. It is the interaction of the incident and reflected waves that generate standing waves in a structure. Those mode shapes identical to the formed standing waves are then excited. Therefore, preventing the formation of the standing waves results in reduction of structural vibrations. The progressive wave control can be utilized to reduce vibrations by eliminating its source, namely reflected waves. The later approach makes all the structural vibration modes inactive. In other words, a finite structure appears to have features similar to an infinite structure in which vibration modes do not form. The standing wave control technique, on the other hand, relies on the production of standing waves that do not tune to the natural modes of a structure. In this case, the externally generated standing waves dominate the structural response and thereby suppress the power flow.

Vibration intensity distribution patterns (also referred to as power flow patterns) can be implemented in a structure in the numerous different patterns, such as but not limited to a straight, S-shape, or vortex pattern. These power flow patterns have the potential to confine excess vibrational energy in a restricted area, or to divert power flow out of a specified section of a structure into another area. In both cases, the critical section of the structure remains at a low vibration level.

The location and number a set of actuators is used in one embodiment of the present invention to induce energy confinement and thereby trap the vibration energy near the input source. The magnitude of a force applied by the actuators and a phase of the force relative to the disturbance is also used to induce vortex confinement. Contrary to conventional methods that usually make an attempt to suppress, dissipate, or cancel excess vibrational energy, energy confinement by Vortex Power Flow approach traps vibrational energy around the disturbance source and away from the critical areas while dissipating some of the energy during the process.

Figure 4A:
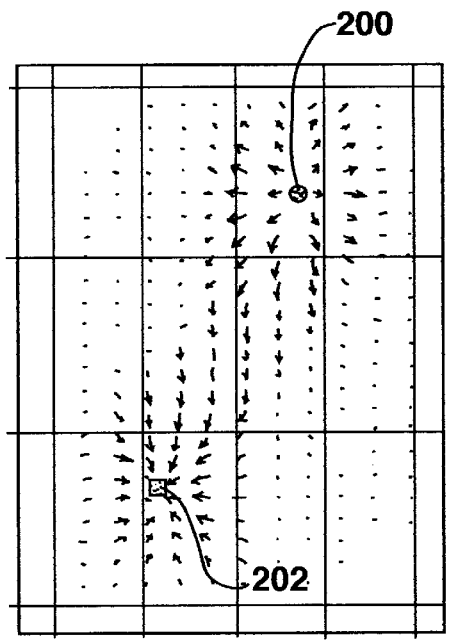
FIGS. 4A–4C show three possible power flow patterns used to manage energy in a structure excited by a disturbing force.
Figure 4B:
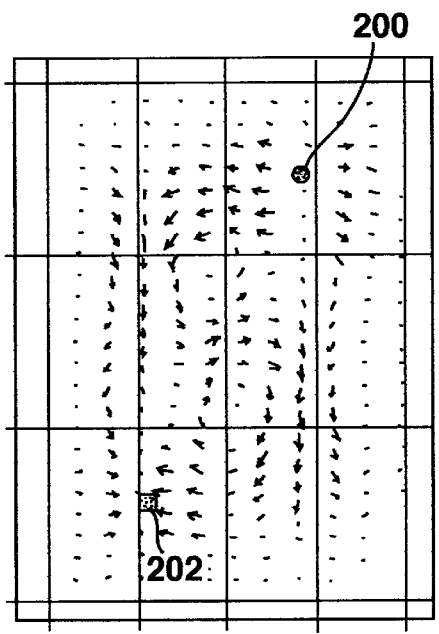
Figure 4C:
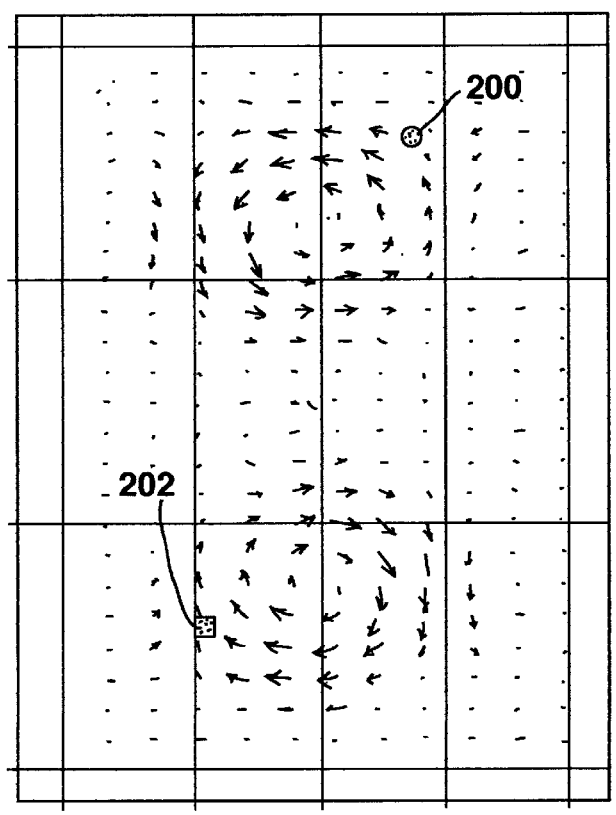

FIGS. 4A–4C show three possible power flow patterns used to manage energy in a structure excited by a disturbing force and controlled by a single actuator. The power flow patterns are straight, S-shaped, and vortex. If the structure is excited and controlled near the first bending mode, power flows straight (see FIG. 4A) from the disturbance 200 (or source) to the actuator 202 (or sink). A straight flow pattern may be used for actively steering energy to the most suitable location within a structure. Exciting and controlling the structure near the fourth bending mode forces power to flow in an S-shaped pattern (see FIG. 4B) from the disturbance 200 (or source) to the actuator 202 (or sink). Small vortices may be formed. An S-shaped flow pattern may be useful in the cases when energy should be steered via complex paths to desirable locations within a structure. Small and nested vortices, which coexist with S-shaped flow patterns, may be utilized to isolate multiple critical components (i.e., sensitive electronics or sensor array) within a structure, such as the skin of an air- or space-borne vehicle. Finally, vortex power flow patterns (see FIG. 4C) can be induced when the structure is excited and controlled near the sixth bending mode. Power is trapped in a circular pattern around the disturbance 200 (or source) and actuator 202. It is observed that the disturbance and actuator are not positioned at the center (or "eye") of each vortex. A vortex power flow pattern is useful in preventing the propagation of energy away from the source.

The present invention can have a significant influence on the reduction or control of radiated noise when compared with conventional skins. In regard to attenuation of radiated noise (such as reduction of noise in aircraft interior) and acoustic signals, active noise control (ANC) and active structural acoustic control (ASAC) techniques are effective in low-frequency ranges. In the case of ANC, sensors and actuators (i.e., microphones and loudspeakers) are required to be positioned in the acoustic field. In the case of ASAC, however, sensors and actuators (i.e., accelerometers and PZT patches) are usually integrated within a radiating structure. As in the case of ASAC technique, the present invention allows for the integration of sensors and actuators within the skin structure. However, what makes the proposed method distinct and superior to the conventional ASAC approach is that actuators are used for the purpose of steering and managing vibrational energy of a skin structure, thereby, reducing its radiating power by proactively limiting certain regions of a structure to receive energy to vibrate.

As explained above, the present smart skin can be controlled using vortex power flow. The present invention can also provide feedback forces proportional to spatial derivatives of system displacements, velocities, and/or accelerations to control the distribution of vibration energy in a structure or machine. When applied in the proper proportions, these feedback forces have the capacity to produce an exponentially varying vibration response magnitude in a structure or component. As such, the system's response may be tailored either to suppress or amplify vibration at specified regions or components. Embodiments of the present invention include sensors, signal processing, and actuators to monitor the response of the structure, calculate the spatial derivatives of the system displacements, velocities, and accelerations, and apply the necessary feedback forces. See U.S. patent application Ser. No. 09/721, 102, entitled "ACTIVE MANAGEMENT AND STEERING OF STRUCTURAL VIBRATION ENERGY", filed Nov. 22, 2000, and incorporated herein for a more detailed description of Active Vibration Control by Confinement (AVCC).

In one embodiment, the present invention uses active feedback actuation to confine vibration energy to specified regions of the skin by modifying the system's vibration characteristics, referred to herein as Active Vibration Control by Confinement (AVCC). This approach is distinctly different than prior active vibration control techniques in that this technique utilizes not only the time-dependent characteristics of the system response, but also their space-dependent characteristics. Through the application of feedback forces proportional to the spatial partial derivatives of the system displacements, velocities, and accelerations, vibration modes are altered to effectively confine or redistribute the vibration energy in the spatial domain. Contrary to conventional methods, the vibration response of the system can be controlled independently of the type of disturbance.

The present invention is differentiated from prior vibration control methods on several levels. Perhaps the most significant difference lies in the confinement of vibration energy itself. In prior techniques, the reduction of vibration assumes that the control mechanism-responds to the incoming vibration. That is, the systems are reactive. The present methodology, on the other hand, prohibits specified regions of a system from accepting vibration energy. In this sense, the approach is proactive.

All currently available methods of vibration control assume that vibration will propagate into a control region. That is, the unwanted vibration is addressed only after the vibration has reached a critical area. Specifically, for isolation techniques, it is assumed that vibration will be present in a system at the interface between two components. It is at this interface that the isolation reacts to the incoming vibration, reducing its propagation. For the case of absorption, without vibration being delivered to the absorption mechanism, it is ineffective. This control method then reduces the vibration energy in the remaining system components. Suppression techniques are most effective when large amounts of energy are delivered to the damping mechanism. In this case, it is first necessary for vibration to be present in the system, and only then is it is dissipated. Prior art active vibration control techniques rely on the application of forces that counteract and cancel the vibration present in the system. For these control mechanisms, it is assumed that vibration will first reach an unwanted region, and then will be canceled. It is clear that each of these mechanisms operates in a reactive mode.

In one embodiment of the instant invention, feedback forces proportional to the spatial derivatives of the system displacements, velocities, and/or accelerations induce confinement. The result is spatial vibration confinement in the form of an exponential decay in vibration magnitude along the length of the structure or its components. As a result, vibration is confined to non-critical regions of the system, preventing vibration energy from propagating to regions of the system that must remain vibration free.

As described above, a first type of energy management or confinement that can be implemented using the skin structure of the present invention is referred to herein as Active Vibration Control by Confinement (AVCC). Vibration energy confinement can be realized by an appropriate application of active forces using the skin actuators. This approach can be used to assist or replace the implementation of confinement via structural design modification or confining elements. FIGS. 5A and 5B illustrate this type of energy confinement. A portion of a skin structure is illustrated in FIG. 5A as having regions of maximum vibration 500 and regions of minimum vibration 510. The terms minimum and maximum are not intended to be absolutes, but are used to demonstrate significant differences between regions of the skin. FIG. 5B is a cross-section of the skin with representative vibration waves 520 illustrated. It will be appreciated by those skilled in the art with the benefit of the present description, that the actuators in the skin can be used to confine vibrations to specific regions.

The second type of energy management or confinement that can be implemented using the skin structure of the present invention is referred to herein as Energy Confinement by Vortex Power Flow (EC-VPF). Vortex-type intensity response patterns are generated in the skin structure.

Some of the differences between the present energy management system and currently practiced active vibration confinement methods are graphically displayed in FIGS. 6A and 6B. The standard steps in controlling vibrations based on common practices are shown in FIG. 6A and an embodiment of the present system is shown in FIG. 6B. In FIG. 6A, step 600 represent the initial stage of an open loop systems where the structure is vibrating with its energy extended throughout its domain. Conventional vibration control methods use passive and/or active damping elements 610 (circles shown in step 602) are added to the structure, see step 612. After the damping elements are activated, overall vibrations of the structure are reduced as shown in step 620.

One embodiment of the present energy-based smart vibration control system is illustrated in FIG. 6B. Step 630 illustrates energy vibrations 625 in a structure. The structure includes actuators, as explained above, that can be controlled to manage energy. The energy of the structure illustrated in step 630 is first moved from critical areas of the structure to less critical areas as shown in step 640. In this illustrated example, it is assumed that the middle section of the structure is a more critical area whose excess vibrations can have significant impact on the overall performance, safety, and mission attainability of the structure. Furthermore, it is assumed that the two side sections are more suitable regions to trap the excess vibration energy. The energy is confined using either the active forces application method, or the vortex steering method explained above.

If desired, the excess vibration energy can then be removed or reduced by using either passive or active elements (circles 660 shown in step 650). The resulting energy management of the structure is shown in step 670. After the vibrational energy is removed via the concentrated damping elements, the selected critical areas have several orders of magnitude less vibration energy than the non-critical areas, step 680. It should be noted that even the non-critical parts have lower levels of vibrations when compared with common passive and active practices. Combining the spatial confinement of vibrations and the concentrated passive and/or active damping elements are the two distinct features of one embodiment of the energy management approach of the present invention. Spatial confinement of the vibration energy using the skin structure allows system designers and control experts to better utilize a limited number of passive elements and active actuators whose power requirements have always been an issue.

The current invention has significant advantages over the other available methods. The application of AVCC to vibrating skin systems allows specified regions of the skin to reach an acceptable level of vibration faster than prior approaches. It is conceivable that the current invention may be implemented to simply prohibit vibrational energy from propagating into the critical regions of the skin. The current invention, however, has the capability to reduce the absolute level of vibration to levels below that of prior techniques. The redistribution of vibration energy, as embodied in the current AVCC invention, dictates that less energy is needed to redirect the vibration than is required to cancel it. The current invention may require less power and fewer actuators than the prior active vibration cancellation methods since the prior methods require vibration cancellation at all parts of the system.

The present invention differs from the currently available methods in the commercial market by inducing a set of forces proportional to the spatial derivative (i.e., strain, shear force) of the structure at the point of application. Further, vortex-type intensity response patterns generated in a structure, subjected to steady-state vibrations, have a strong potential for confining the vibration power flow into a specific area of the structure.

There is a definite need for an effective and low cost vibration control system suitable for both military and commercial applications. Skin structures have applications in commercial watercraft, aircraft, space vehicles, automobiles, marine systems, machinery, machine tools, and home appliances. For example, FIG. 5 illustrates a simplified airplane 300 having a skin structure according to the present invention. The skin structure can be limited to specific locations of the airplane.

The skin structure of the present invention can be applied in vehicles whose load-bearing skin make up a critical part and directly influence the performance and functionality of the vehicle. Passenger and fighter aircraft, space vehicles, unmanned airborne and underwater vehicles, submarines, surface ships, and automobiles will benefit by incorporating the present inventions. In the case of passenger aircraft, the skin can be used to eliminate cabin noise, which has been a major concern for the industry. The invention can also be applied in systems whose skin is not a load-bearing element. One of the most promising and exciting commercial applications is smart "wallpaper" (i.e., a very thin skin). In a room or auditorium whose walls are composed of the present skin, the acoustic characteristics of the room can be altered. In addition, the present invention can be applied to computer enclosures to reduce the noise radiated in office areas, clean rooms, and quality inspection rooms where even the smallest disturbances cannot be tolerated. Suppression of vibration and shock are also very critical in many systems such as antennas, airborne systems, aircraft, launch vehicles, space structures, and ground and marine vehicles. An additional embodiment of the present invention includes a skin material that is formed as tape that can be applied to a surface to manage vibrations in the surface. In this embodiment, the tape is similar to the skin described above. The tape, however, is substantially flexible and may not contain an outer layer, such as a metal layer. In contrast, the actuators of the tape have a thin layer that separated them from the attached surface.

All of the embodiments described herein can be self-powered. That is, the actuators require some power supply. This power supply can be generated by using the sensors. For example, piezoelectric sensors/actuators can be used to generate power from the energy present in the skin structure. This power can be channeled to power the system or charge batteries for the system.

In summary, the present invention can be applied in commercial watercraft, aircraft, space vehicles, automobiles, marine systems, machinery, machine tools, home appliances, and personal computers. It may also be used in buildings, bridges, and offshore oil platforms. Another commercial application may be found in manufacturing and processing plants. A smart structure with embedded energy-management characteristics will reduce excess noise and vibrations of the machinery used in these plants and thereby, will improve productivity, quality, and profitability.

Figure 7:
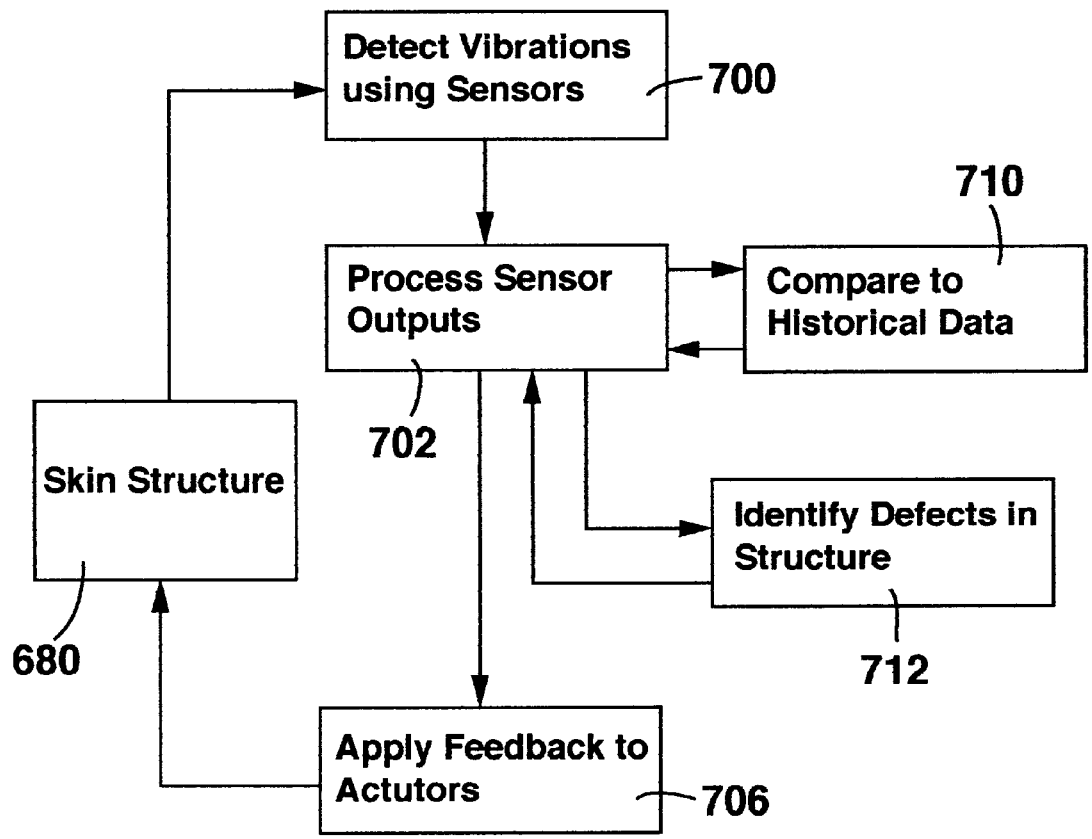
FIG. 7 is a flow chart of vibration confinement and defect detection of an embodiment of the present invention.

FIG. 7 illustrates a flow chart of an embodiment of the present invention. During operation, the sensors coupled to the skin structure 680 detect vibrations, step 700. An external processor at step 702 processes the sensor outputs. The processor determines the appropriate feedback forces to apply to the skin using the actuators, step 706. The sensors continue to monitor the vibrations to determine if the vibrations have been modified. The processor can continue to adjust the actuators until the desired level of confinement is reached. In an alternate embodiment, a look-up table of historical data is used by the processor to determine if defects have developed in the structure. That is, cracks of other defects that form in a skin can change the vibration response of the system. The processor can detect these changes. The processor can then issue a warning at step 712 that a potential defect has been identified and an inspection is necessary. The processor then applies the feedback forces to the actuators and surrounding actuators to reduce the possibility of propagation of the defect.

Conclusion

A smart skin structure has been described with vibration energy managing and steering capabilities. The skin can be used to managing vibrations in the skin or shell of a system, subcomponent, device, or structure. The skin has sensors coupled to the skin to obtain a response to vibrations. Actuators integral with the skin can be selectively activated to apply forces to the skin to confine or redirect vibration energy to one or more predetermined skin regions. The forces applied by the actuators can be controlled to create confinement power flows. Further, the skin actuators can be controlled using spatial derivatives of the vibration forces. The structure can be used in, but is not limited to, watercraft, aircraft, space vehicles, automobiles, marine devices, industrial machinery, machine tools, home appliances, buildings, bridges, and offshore oil platforms.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A skin structure comprising:
   a skin;
   sensors coupled to the skin to measure vibrations of the skin; and
   actuators integral with the skin that are selectively activated to apply forces to the skin to redirect vibration energy to one or more predetermined skin regions.

2. The skin structure of claim 1 wherein the skin structure is embodied in a transportation device.

3. The skin structure of claim 1 wherein the skin structure is embodied in a consumer device.

4. The skin structure of claim 1 wherein the skin structure is embodied manufacturing equipment.

5. The skin structure of claim 1 wherein the actuators comprise piezoelectric rods.

6. The skin structure of claim 1 wherein the sensors comprise piezoelectric rods integrally formed in the skin.

7. The skin structure of claim 1 wherein the sensors are coupled to a processor to detect vibration forces and provide control signals to the actuators.

8. The skin structure of claim 7 wherein the control signals activate the actuators to provide either a straight pattern power flow in the skin, an s-shaped pattern power flow in the skin, or a vortex pattern power flow in the skin.

9. The skin structure of claim 7 wherein the control signals activate the actuators based upon spatial derivatives of the detected vibration forces.

10. The skin structure of claim 1 wherein the skin structure is either flat or curved.

11. The skin structure of claim 1 further comprising a passive damping element coupled to the skin.

12. A skin material comprising:
    an outer layer;
    sensors integral with the outer layer to measure vibrations of the outer layer; and
    actuators integral with the outer layer that are selectively activated to apply forces to the outer layer to redirect vibration energy to one or more predetermined skin regions.

13. The skin material of claim 12 wherein the sensors of the skin material are coupled to a controller to detect vibration forces and provide control signals to the actuators.

14. The skin material of claim 13 wherein the control signals activate the actuators to provide either a straight pattern power flow in the skin, an s-shaped pattern power flow in the skin, or a vortex pattern power flow in the skin to redirect vibration energy to one or more predetermined skin material regions.

15. The skin material of claim 13 wherein the control signals activate the actuators to apply feedback forces applied by the actuators such that the feedback forces are proportional to a spatial derivative of the detected vibration forces of the skin material.

16. The skin material of claim 12 wherein the outer layer is comprised of metal.

17. The skin material of claim 12 wherein the actuators and sensors each comprise piezoelectric devices.

18. The skin material of claim 12 further comprises a passive damping element to dissipate vibrations.

19. A structure having a skin material comprising:
    an outer layer;
    sensors coupled to the outer layer to measure vibrations in the outer layer;
    actuators integral with the outer layer; and
    a controller coupled to the sensors to provide control signals to the actuators, wherein the control signals activate the actuators to provide a power flow in the outer layer to redirect vibration energy to one or more predetermined regions of the outer layer.

20. The structure of claim 19 wherein the sensors and actuators comprise piezoelectric devices.

21. The structure of claim 19 wherein the structure is selected from the group comprising watercraft, aircraft, space vehicles, automobiles, marine devices, industrial machinery, machine tools, home appliances, buildings, bridges, and offshore oil platforms.

22. The structure of claim 19 further comprising a passive damping element to dissipate vibrations.

23. A method of controlling vibrations in a skin structure comprising:

detecting vibrations in the skin structure; and applying feedback forces to actuators integrally formed in the skin to redirect vibration energy by creating an energy power flow pattern in the skin.

24. The method of claim 23 wherein the energy power flow pattern is a straight pattern power flow, an s-shaped pattern power flow, or a vortex pattern power flow.

25. The method of claim 23 wherein the skin structure is embodied in a structure selected from the group comprising watercraft, aircraft, space vehicles, automobiles, marine devices, industrial machinery, machine tools, home appliances, buildings, bridges, and offshore oil platforms.

26. The method of claim 23 wherein the actuators comprise piezoelectric devices.

27. The method of claim 23 further comprises:

generating a power supply voltage using sensors coupled to the skin structure, wherein the sensors generate the power supply voltage in response to vibration energy in the skin structure; and coupling the power supply voltage to the actuators.

28. A method of controlling vibrations in a skin structure comprising:

detecting vibrations in the skin structure;

applying feedback forces to actuators integrally formed in the skin to redirect vibration energy to one or more predetermined regions of the skin structure; and dissipating the redirected vibration energy from the one or more predetermined regions of the skin structure using a passive dissipation element.

29. A method of controlling vibrations in a skin structure comprising:

detecting vibrations in the skin structure;

processing the detected vibrations to determine appropriate feedback forces to apply;

comparing the determined feedback forces to historical data;

determining if a defect is present in the skin structure; and applying the feedback forces to actuators integrally formed in the skin to redirect vibration energy.

* * * * *